United States Patent
Moujdin

(10) Patent No.: US 11,305,234 B1
(45) Date of Patent: Apr. 19, 2022

(54) SUPERCOIL FILTRATION UNIT

(71) Applicant: King Abdulaziz University, Jeddah (SA)

(72) Inventor: Iqbal Ahmed Moujdin, Jeddah (SA)

(73) Assignee: King Abdulaziz University, Jeddah (SA)

( * ) Notice: Subject to any disclaimer, the term of this patent is extended or adjusted under 35 U.S.C. 154(b) by 0 days.

(21) Appl. No.: 17/476,944

(22) Filed: Sep. 16, 2021

(51) Int. Cl.
| | |
|---|---|
| *B01D 63/02* | (2006.01) |
| *B01D 24/10* | (2006.01) |
| *B01D 53/04* | (2006.01) |
| *B01D 69/02* | (2006.01) |

(Continued)

(52) U.S. Cl.
CPC ......... *B01D 63/025* (2013.01); *B01D 24/105* (2013.01); *B01D 53/04* (2013.01); *B01D 69/02* (2013.01); *C02F 1/004* (2013.01); *C02F 1/44* (2013.01); *B01D 2101/04* (2013.01); *B01D 2253/102* (2013.01); *B01D 2313/246* (2013.01);

(Continued)

(58) Field of Classification Search
CPC ...... B01D 61/18; B01D 63/02; B01D 63/068; B01D 63/043; B01D 63/06; B01D 63/025; B01D 63/027; B01D 63/063; B01D 65/08; B01D 69/04; B01D 2313/23; B01D 2313/54; B01D 2317/022; B01D 2315/06; B01D 2321/2016; B01D 2321/2008; B01D 24/105; B01D 53/04; B01D 69/02; B01D 2101/04; B01D 2253/102; B01D 2313/246; B01D 2315/10; B01D 2325/02; C02F 1/004; C02F 1/44; C02F 2303/10
See application file for complete search history.

(56) References Cited

U.S. PATENT DOCUMENTS

| | | | |
|---|---|---|---|
| 4,808,378 A | * | 2/1989 | Nakanishi ............ B01D 63/025 128/DIG. 3 |
| 4,838,970 A | | 6/1989 | Thibos |
| 5,002,661 A | | 3/1991 | Chick et al. |

(Continued)

FOREIGN PATENT DOCUMENTS

| | | |
|---|---|---|
| CN | 108097060 A | 6/2018 |
| KR | 10-0530106 | 11/2005 |

OTHER PUBLICATIONS

Ghogomu, et al. ; Hollow-fibre membrane module design: comparison of different curved geometries with Dean vortices ; Journal of Membrane Science vol. 181, Issue 1 ; Jan. 15, 2001 ; PP71-80 ; Abstract Only ; 2 Pages.

*Primary Examiner* — Pranav N Patel
(74) *Attorney, Agent, or Firm* — Oblon, McClelland, Maier & Neustadt, L.L.P.

(57) ABSTRACT

A supercoil filtration unit is provided. The supercoil filtration unit includes an outer coil, and an inner coil disposed within the outer coil. The inner coil includes a plurality of hollow fiber membranes which are aligned and arranged into a helical bundle containing multiple turns of the inner coil per turn of the outer coil. The supercoil filtration unit further includes a feed inlet, a permeate outlet, and a retentate outlet. The feed inlet is disposed upon the outer coil and in fluid communication with a first interior volume. The permeate outlet is disposed upon the outer coil at a location distant from the feed inlet and in fluid communication with a second interior volume. The retentate outlet is disposed upon the outer coil at a location distant from the feed inlet and in fluid communication with the first interior volume.

20 Claims, 7 Drawing Sheets

(51) Int. Cl.
*C02F 1/00* (2006.01)
*C02F 1/44* (2006.01)

(52) U.S. Cl.
CPC ...... *B01D 2315/10* (2013.01); *B01D 2325/02* (2013.01); *C02F 2303/10* (2013.01)

(56) References Cited

U.S. PATENT DOCUMENTS

| | | |
|---|---|---|
| 5,202,023 A | 4/1993 | Trimmer et al. |
| 5,204,002 A | 4/1993 | Belfort et al. |
| 5,626,758 A | 5/1997 | Belfort |
| 6,203,707 B1 | 3/2001 | Hartmann |
| 6,824,679 B1 | 11/2004 | Dzengeleski et al. |
| 10,576,425 B2 | 3/2020 | Jen |
| 2006/0065588 A1 * | 3/2006 | Koch .................. B01D 53/22 210/321.88 |

* cited by examiner

SUPERCOIL FILTRATION UNIT

BACKGROUND OF THE INVENTION

Field of the Invention

The present disclosure relates to a filtration unit and, more particularly relates, to a filtration unit implementing hollow fiber membrane.

Discussion of the Background

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

With increases in the levels of pollution in air and water due to presence of particulate matter, there has been a rise in demand for separation methods which are capable of providing filtered air and water. Amongst various separation methods, hollow fiber membrane filtration is known as a green technology, particularly in freshwater recovery. Hollow fiber membrane filtration uses a bundle of hollow fibers having a semi-permeable barrier configured to allow selective permeation through a wall.

Although hollow fiber membrane filtration is known to exhibit desirable packing density, productivity, and low power consumption, hollow fiber membrane filtration suffers certain drawbacks, such as fouling and scaling of impurities on membrane surfaces thus resulting in a deterioration of filtration efficiency. Conventional solutions to overcome fouling in the hollow fiber membranes are observed to be non-economical. In addition, fabrication of hollow fiber membrane filtration units requires special tools which render the fabrication process cumbersome, thereby hindering implementation of hollow fiber membrane filtration units in laboratories and commercial spaces.

SUMMARY OF THE INVENTION

According to an aspect of the present disclosure, a supercoil filtration unit is disclosed. The supercoil filtration unit includes an outer coil having a helical shape defined by an outer coil longitudinal axis and outer coil turns wound around the outer coil longitudinal axis and an inner coil comprising a plurality of hollow fiber membranes which are aligned and arranged into a helical bundle, the inner coil being disposed within the outer coil and being oriented such that an inner coil longitudinal axis around which turns of the inner coil are wound is substantially parallel with the turns of the outer coil. The supercoil filtration unit further comprises a feed inlet, a permeate outlet, and a retentate outlet. The feed inlet is disposed upon the outer coil near a first end and in fluid communication with a first interior volume. The permeate outlet is disposed upon the outer coil near a second end at a location distant from the feed inlet and in fluid communication with a second interior volume. The second interior volume is not in fluid communication with the first interior volume. The retentate outlet is disposed upon the outer coil near the second end at a location distant from the feed inlet and in fluid communication with the first interior volume.

In some embodiments, the first interior volume is defined by the outer coil and the second interior volume is defined by the inner coil. In some embodiments, the first interior volume is defined by the inner coil and the second interior volume is defined by the outer coil In some embodiments, each of the outer coil and the inner coil has a lead angle of 15° to 60°. In some embodiments, the outer coil has 5 to 10 turns per meter and the inner coil has 40 to 80 turns per meter. In some embodiments, the outer coil has an outer diameter of 0.15 to 0.35 m.

In some embodiments, the plurality of hollow fiber membranes is aligned and arranged in the helical bundle in a substantially parallel configuration. In some embodiments, the plurality of hollow fiber membranes is aligned and arranged in the helical bundle in a twisted configuration.

In some embodiments, the outer coil comprises a metallic support. In some embodiments, the hollow fiber membranes are constructed of a polymer. In some embodiments, the polymer is at least one selected from the group consisting of cellulose acetate, polysulfone, polyethersulfone, and polyvinylidene fluoride.

In some embodiments, the hollow fiber membranes have a mean pore size of greater than 0.01 to 0.1 µm. In some embodiments, the hollow fiber membranes have a mean pore size of greater than 0.001 to 0.01 µm. In some embodiments, the hollow fiber membranes have a mean pore size of greater than 0.0001 to 0.001 µm.

According to another aspect of the present disclosure, a wastewater treatment and mineral water processing system, comprising a feed tank, a sediment removal module connected to the feed tank, a gas adsorption module connected to the sediment removal module, a tangential module comprising the supercoil filtration unit of claim 1 wherein the feed inlet is connected to the gas adsorption module, wherein the tangential module separates a feed comprising a contaminated water into a permeate and a retentate.

In some embodiments, the sediment removal module comprises a packed bed of a silicate-containing material and the gas adsorption module comprises activated carbon.

In some embodiments, the system further comprises one or more energy recovery turbines, each turbine being connected to the permeate outlet or the retentate outlet.

According to another aspect of the present disclosure, a method of separating components in a liquid mixture is provided. The method includes supplying the liquid mixture to the supercoil filtration unit, collecting the retentate from the retentate outlet and collecting a permeate from the permeate outlet.

In some embodiments, the method further includes passing the liquid mixture through a packed bed of a silicate-containing material before supplying to the supercoil filtration unit. In some embodiments, the method further comprises passing the permeate, the retentate, or both separately through an energy-recovery turbine.

DETAILED DESCRIPTION OF THE INVENTION

In the following description, it is understood that other embodiments may be utilized, and structural and operational changes may be made without departure from the scope of the present embodiments disclosed herein.

Reference will now be made in detail to specific embodiments or features, examples of which are illustrated in the accompanying drawings. Wherever possible, corresponding, or similar reference numbers will be used throughout the drawings to refer to the same or corresponding parts. Moreover, references to various elements described herein, are made collectively or individually when there may be more than one element of the same type. However, such references are merely exemplary in nature. It may be noted that any reference to elements in the singular may also be construed to relate to the plural and vice-versa without limiting the scope of the disclosure to the exact number or type of such elements unless set forth explicitly in the appended claims.

As used herein, the terms "optional" or "optionally" means that the subsequently described event(s) can or cannot occur or the subsequently described component(s) may or may not be present (e.g., 0 wt. %). As used herein the words "a" and "an" and the like carry the meaning of "one or more."

Aspects of the present disclosure relate to a supercoil filtration unit. The supercoil filtration unit comprises an outer coil having a helical shape defined by an outer coil longitudinal axis and outer coil turns wound around the outer coil longitudinal axis and an inner coil comprising a plurality of hollow fiber membranes which are aligned and arranged into a helical bundle, the inner coil being disposed within the outer coil and being oriented such that an inner coil longitudinal axis around which turns of the inner coil are wound is substantially parallel with the turns of the outer coil. This arrangement of an inner coil disposed within an outer coil and having turns of the inner coil wound around the inner coil longitudinal axis which itself is wound to be substantially parallel with the turns of the outer coil creates a supercoil configuration in which there are multiple turns of the inner coil per turn of the outer coil, the turns of the inner coil being oriented substantially perpendicular to the turns of the outer coil. The inner coil longitudinal axis itself has a coil shape which is substantially the same as the helical shape of the outer coil. The supercoil configuration may be advantageous for providing high surface area for filtration with high packing density. This high packing density allows for high performance filtration in a more compact overall size compared to non-supercoil filtration units. The supercoil filtration unit may be particularly useful for wastewater treatment. For example, the supercoil filtration unit may be implemented in industries, such as refineries, textile, tanneries, sugar manufacturing and desalination plants.

Figure 1A:
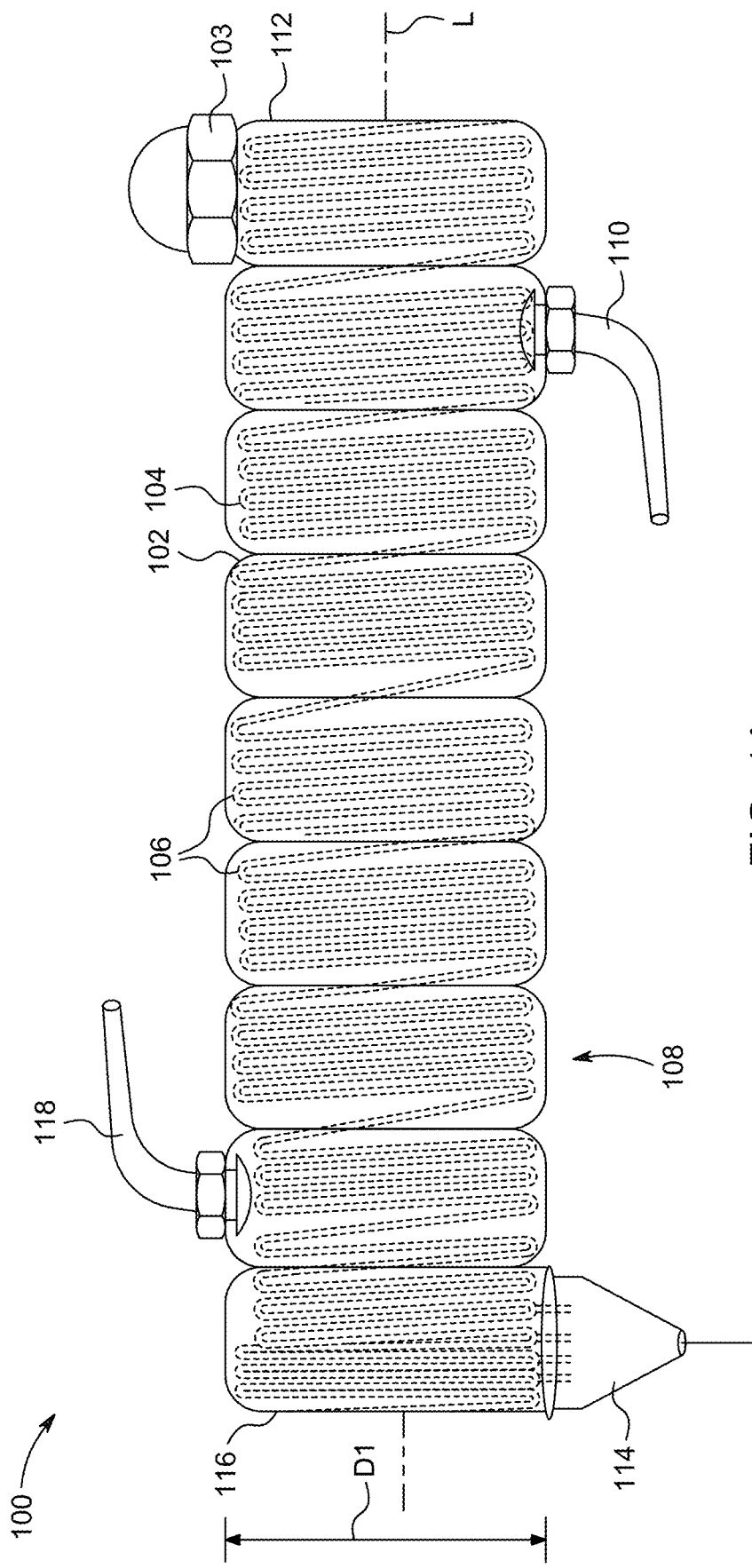
FIG. 1A illustrates a supercoil filtration unit, according to an embodiment of the present disclosure.

FIG. 1A illustrates a supercoil filtration unit 100, according to an embodiment of the present disclosure. For the purpose of convenience, the supercoil filtration unit 100 is alternatively referred to as "the unit 100" in the present disclosure. In an embodiment, the unit 100 includes an outer coil 102, embodied in form of a hollow tube, defining a first interior volume "V1", and wound about an outer coil longitudinal axis "L" to form a helical structure. In the exemplary embodiment depicted in FIG. 1A, each turn of the outer coil 102 abuts and is in contact with an adjacent turn of the outer coil, thereby forming a compact structure. In some embodiments, a turn of the outer coil is not in contact with an adjacent turn of the outer coil. The outer coil 102 defines a lead angle θ1 and an outer diameter "D1". As used herein, the term "lead angle" refers to an angle defined between a helix and a plane a rotation of the helix. In an embodiment, the lead angle θ1 may be a range of about 10° to about 65°, preferably about 12.5° to about 60°, preferably about 15° to about 55°, preferably about 17.5 to about 50°, preferably about 20 to 47.5°, preferably about 22.5 to 45°, preferably about 25 to 40°, preferably about 27.5 to 37.5°. In an embodiment, the outer diameter "D1" may be in the range of about 0.1 m to about 0.4 m, preferably about 0.15 m to about 0.35 m, preferably about 0.18 m to about 0.32 m.

Further, the outer coil 102 may have a predefined number of turns. In one embodiment, the outer coil 102 may have about 3 to 12 turns per meter, preferably about 5 to 10 turns per meter. The outer coil 102 may take the shape of a left-handed helix or a right-handed helix.

In some embodiments, the outer coil 102 is transparent. Such transparency may be advantageous for monitoring a cleanliness, an integrity, or other performance or maintenance metric of the supercoil filtration unit. In alternative embodiments, the outer coil 102 is not transparent. In other alternative embodiments, a portion of the outer coil 102 is transparent while a remainder of the outer coil 102 is not transparent.

In general, the outer coil 102 may be constructed of any suitable material known to one of ordinary skill in the art. Examples of such suitable materials include, but are not limited to stainless steels, aluminum alloys, polymers, and brass. In some embodiments, the outer coil 102 may be manufactured using polymers, for example, but not limited to, acrylonitrile butadiene styrene (ABS), chlorinated polyvinyl chloride (CPVC), high-density polyethylene (HDPE), polybutylene (PB-1), polyethylene (PE), polyethylene of raised temperature (PE-RT), polypropylene (PP), polyvinylidene difluoride (PVDF), unplasticized polyvinyl chloride (uPVC), or combinations thereof. In some embodiments, the outer coil 102 further includes a metallic support 103.

The unit 100 further includes an inner coil 104 disposed within the outer coil 102. In the exemplary embodiment depicted in FIG. 1A, the inner coil 104 is embodied as a bundle of hollow tubes. This bundle defines a second interior volume "V2" therein, and comprises turns of the bundle wound about an inner coil longitudinal axis. This inner coil longitudinal axis itself is wound about the outer coil longitudinal axis "L" to form a supercoil or superhelical structure. The inner coil 104 defines a lead angle θ2. In an embodiment, the lead angle θ2 may be in a range of about 10° to about 65°, preferably about 12.5° to about 60°, preferably about 15° to about 55°, preferably about 17.5 to about 50°, preferably about 20 to 47.5°, preferably about 22.5 to 45°, preferably about 25 to 40°, preferably about 27.5 to 37.5°. The inner coil 104 may have a predefined number of turns. In one embodiment, the inner coil 104 may have about 30 to about 90 turns per meter, preferably about 40 to about 80 turns per meter. The inner coil 104 may take the shape of a left-handed helix or a right-handed helix. The inner coil 104 may be of the same handedness as the outer coil 102 or may be of the opposite handedness as the outer coil 102.

According to an aspect of the present disclosure, the inner coil 104 includes a plurality of hollow fiber membranes 106 aligned and arranged into a helical bundle 108. As used herein, the term "aligned" may be understood to include an arrangement of the hollow fiber membranes 106, where each hollow fiber membrane 106 is disposed substantially parallel to and/or to have tube ends placed substantially in the same plane as another hollow fiber membrane 106 along the longitudinal axis "L". As can be seen in FIG. 1A, each turn of the outer coil 102 houses multiple hollow fiber membranes 106, such that the hollow fiber membranes 106 in each turn constitutes the helix bundle 108. Such helical arrangement allows the hollow fiber membranes 106 to be accommodated in minimum space available within the outer coil 102, thereby increasing packing density of the hollow fiber membranes 106. It should be understood that each hollow fiber membrane 106 defines a continuous channel from one end of the outer coil 102 to another end of the outer coil 102. A volume of such continuous channel is referred to as "the second interior volume V2" in the present disclosure. Additionally, the helical arrangement may be advantageous for forming or controlling the properties of vortices in a flow pattern of the fluid flowing in the inner coil 104, thereby reducing fouling of the hollow fiber membranes 106.

The first interior volume V1 should be understood to be bound and defined externally by a surface of the outer coil 102 and be separate from the second interior volume V2 defined by the inner coil 104. The separation of the first interior volume and second interior volume is provided by the hollow fiber membranes 106 or a surface thereof. This separation should be liquid-tight. A liquid placed into either the first interior volume V1 or the second interior volume V2 may not flow into or directly mix with a fluid placed into the other except by traversing the hollow fiber membranes 106. Such traversing may be part of a filtration process and may be part of an action or method of operation of the hollow fiber membranes. It should be understood that the second interior volume V2 may be, as a whole, comprised of a plurality of individual second interior volume components, each of these components being an interior of a single hollow fiber membrane. Spaces in between individual hollow fiber membranes but in some way associated with the inner coil 104, e.g. adjacent to or surrounded by individual hollow fiber membranes, however, should not be considered to be part of the second interior volume V2. Such spaces may be considered part of the first interior volume V1 as such spaces may be in fluid communication with the first interior volume V1 and allow a liquid in such spaces to flow into or directly mix with a liquid in the first interior volume V1 without passing through a hollow fiber membrane. In this way, the first interior volume V1 and the second interior volume V2 may be considered to be a "pre-filtration volume" and a "post-filtration volume", respectively, as a liquid must be filtered by a hollow fiber membrane to pass from the first interior volume V1 to the second interior volume V2.

In some embodiments, the hollow fiber membranes 106 are made from a polymer selected from a group consisting of cellulose acetate, polysulfone, polyethersulfone, polyvinylidene fluoride, and combinations thereof. However, in alternative embodiments, other polymers known to a person skilled in the art and feasible for manufacturing the hollow fiber membranes 106 may be implemented. In some embodiments, the hollow fiber membranes 106 comprise a fiber coating of a semi-permeable material disposed on an outer surface of the porous hollow fiber. The fiber coating may be configured to allow partial permeation of contents of fluid flowing therethrough, thereby aiding filtration of the fluid. In some embodiments, each of the hollow fiber membranes is substantially the same in terms of pore size, composition, length, diameter, or other suitable measure. In alternative embodiments, each of the hollow fiber membranes is not substantially the same. In such embodiments, there may be two or more types of hollow fiber membranes present. Such types of hollow fiber membranes may be defined by changes in composition, dimeter, length, pore size, or other suitable metric known to one of ordinary skill in the art. In such embodiments, the two or more types of hollow fiber membranes may be randomly distributed throughout the helical bundle. Alternatively, the two or more types of hollow fiber membranes may be arranged in some way so as to create distinct regions or a pattern of the types of hollow fiber membranes in the helical bundle. An example of such a pattern is to have larger diameter hollow fiber membrane(s) form a bundle core and smaller diameter hollow fiber membranes for a bundle periphery. Another example of such a pattern is to create a layered structure to the helical bundle in which there are distinct radial layers to the bundle, each layer comprising a different type of hollow fiber membrane.

In some embodiments, the helical bundle comprises a plurality of hollow fiber membranes arranged in a packed configuration. This packed configuration may be thought of as including arranging the hollow fiber membranes such that each hollow fiber membrane is in contact with at least one other hollow fiber membrane. For hollow fiber membranes having a substantially spherical cross-section, such a packed configuration may take the form of a lattice which is characterized by the shape of voids present in between the hollow fiber membranes when viewed in cross-section. Examples of such lattices include those with voids having triangular, square, hexagonal, elongated triangular, trihexagonal, snub square, truncated square, truncated hexagonal, rectitrihexagonal, snub trihexagonal, mirrored snub trihexagonal, truncated trihexagonal, skew quadrilateral, tie kite, isosceles trapezoid, and right trapezoid. In alternative embodiments, the helical bundle comprises a plurality of hollow fiber membranes arranged in a separated configuration. Such a configuration may be characterized by the fact that none of the hollow fiber membranes is in contact with any other hollow fiber membrane. Such separated configurations may be advantageous for facilitating flow of fluid around the bundle.

In some embodiments, the inner coil 104 comprises bundle supports. These bundle supports may assist in maintaining the shape of the inner coil, an orientation of the hollow fiber membranes in the bundle, a spacing between hollow fiber membranes within the bundle, and/or a position of the inner coil within the outer coil. In general, the bundle supports may be any suitable shape known to one of ordinary skill in the art, for example discs, cylinders, flat polygonal prisms, elongated polygonal prisms, loops, and clips. The bundle supports may have openings through which the hollow fiber membranes may pass. The openings may be completely enclosed or may be not completely enclosed (e.g. encompassing less than 100% of a circumference of a hollow fiber membrane). Openings that are not completely enclosed may permit securing of one or more hollow fiber membranes by a press-fit or snap-fit mechanism. For examples of bundle supports or geometries and/or devices which may be useful as or resemble the bundle supports, see U.S. Pat. No. 7,098,405B2, KR20070084167A, and JP6382985B2.

In one embodiment the supports function to separate and space apart the individual hollow fiber membranes from one another. Preferably the individual hollow fiber membranes are spaced apart by at least 0.5× the outer dimension of the hollow fiber membrane. Preferably the hollow fiber membranes are separated by the supports at a separation of 0.25× to 1.0× the outer diameter of the hollow fiber membrane. The supports are repeated throughout the length of the hollow fiber membranes to maintain distance between individual hollow fiber membranes. Preferably the supports are present at intervals of 10-50× the outer diameter of the hollow fiber membranes to prevent sagging and contact between individual hollow fiber membranes within the outer coil. In one embodiment the supports are discs that fit inside the outer coil and are in partial contact the inner surface of the outer coil. Each disc has a number of perforations through which an individual hollow fiber membrane passes. The perforations are spaced apart at desired distances to separate the hollow fiber membranes.

In some embodiments, the hollow fiber membranes 106 have a mean pore size of greater than 0.01 µm to 0.1 µm. Hollow fiber membranes having such pore sizes are typically used in ultrafiltration and may find use in applications such as removal of particulates and bacteria from water or other fluid, protein purification or isolation, fruit juice concentration and clarification, or as a preliminary step before other filtration techniques. In some embodiments, the hollow fiber membranes 106 may have a mean pore size of greater than 0.001 µm to 0.01 µm. Hollow fiber membranes having such pore sizes are typically used in nanofiltration and may find use in applications such as the removal of viruses from drinking water and water softening. In yet another embodiment, the hollow fiber membranes 106 may have a mean pore size of greater than 0.0001 µm to 0.001 µm. Hollow fiber membranes having such pore sizes are typically used in reverse osmosis and may find use in applications such as water desalination.

The unit 100 further includes a feed inlet 110 disposed upon the outer coil 102. Preferably, the feed inlet 110 is disposed proximal to a first end 112 of the outer coil 102 and in fluid communication with the first interior volume "V1". The feed inlet 110 is configured to direct the fluid to be filtered into the first interior volume "V1" of the outer coil 102. As such, the FIG. 1A illustrates to an embodiment where the first interior volume "V1" is defined by the outer coil 102 and the second interior volume "V2" is defined by the inner coil 104. In an embodiment, the feed inlet 110 may be configured to reduce pressure of the fluid supplied into the first interior volume "V1". For example, the feed inlet 110 may include a gradually increasing diameter portion (as shown in FIG. 1A) to reduce the pressure of fluid entering the outer coil 102 and to retain the hollow fiber membranes 106 intact.

The unit 100 further includes a permeate outlet 114 disposed upon the outer coil 102. Preferably, the permeate outlet 114 is disposed proximal to a second end 116 of the outer coil 102 distant from the feed inlet 110. The permeate outlet 114 is in fluid communication with the second interior volume "V2" of the inner coil 104 which is not in fluid communication with the first interior volume "V1". The inner coil 104 is disposed in fluid communication with the permeate outlet 114, such that permeate fluid is directed through the permeate outlet 114 and further towards end-use applications. Here, it should be understood that the inner coil 104 is configured to allow unidirectional movement of the fluid from the first interior volume "V1" to the second interior volume "V2". The embodiment depicted in FIG. 1A may be known as a "side-feed configuration".

The unit 100 further includes a retentate outlet 118 disposed upon the outer coil 102 proximal to the second end 116 and at a location distant from the feed inlet 110. As used herein, the term "retentate" refers to unfiltered fluid retained in the first interior volume "V1". The retentate outlet 118 is in fluid communication with the first interior volume "V1" of the outer coil 102 to drain the unfiltered fluid from the outer coil 102.

The unit 100 is configured to function as a filtration unit, where the fluid to be subjected to filtration flows in an outward to inward direction within the unit 100. In operation, the unfiltered fluid is supplied, through the feed inlet 110, into the first interior volume "V1" of the outer coil 102. The unfiltered fluid is allowed to pass through the hollow fiber membrane 106 and reach the second interior volume "V2" of the inner coil 104. Such movement of the fluid constitutes the outward to inward flow direction within the unit 100. As such, impurities in the unfiltered fluid remain in the first interior volume "V1" of the outer coil 102 while the filtered fluid is collected in the second interior volume "V2" of the inner coil 104. Flow of the filtered fluid within the inner coil 104 and the unfiltered fluid within the outer coil 102 results in formation of vortices, thereby minimizing fouling and enhancing efficiency of filtration across the hollow fiber membranes 106. Since the inner coil 104 is in fluid communication with the permeate outlet 114, the filtered fluid is allowed to flow through the permeate outlet 114. Constant supply of the unfiltered fluid into the first interior volume "V1" of the outer coil 102 achieves filtration through the hollow fiber membranes 106 and pressurizes the retentate towards the retentate outlet 118.

In some embodiments, the retentate collected from the retentate outlet 118 may be subjected to additional treatment. For example, the retentate may be subjected to subsequent filtration through filtration units implementing filtration media, such as the hollow fiber membranes 106. Filtered fluid from such subsequent filtration units may be recirculated through the feed inlet 110 for further filtration. In some embodiments, a flushing activity may be performed, after each filtration cycle, through the feed inlet 110 to ensure removal of retentate from the first interior volume "V1". In an example, the flushing activity may include, but not limited to, forward flushing, backward flushing, or air flushing. However, during such flushing activity, pressure of water or fluid being flushed may be low to ensure that the inner coil 104 is not damaged. Fluid filtered and collected in the second interior volume "V2" through such flushing activity may be directed to a bin (not shown), the permeate outlet 114, for easy disposal. In some embodiments, the unit 100 may be implemented for filtration of, for example, but not limited to, water, gas, and aerosols.

Figure 1B:
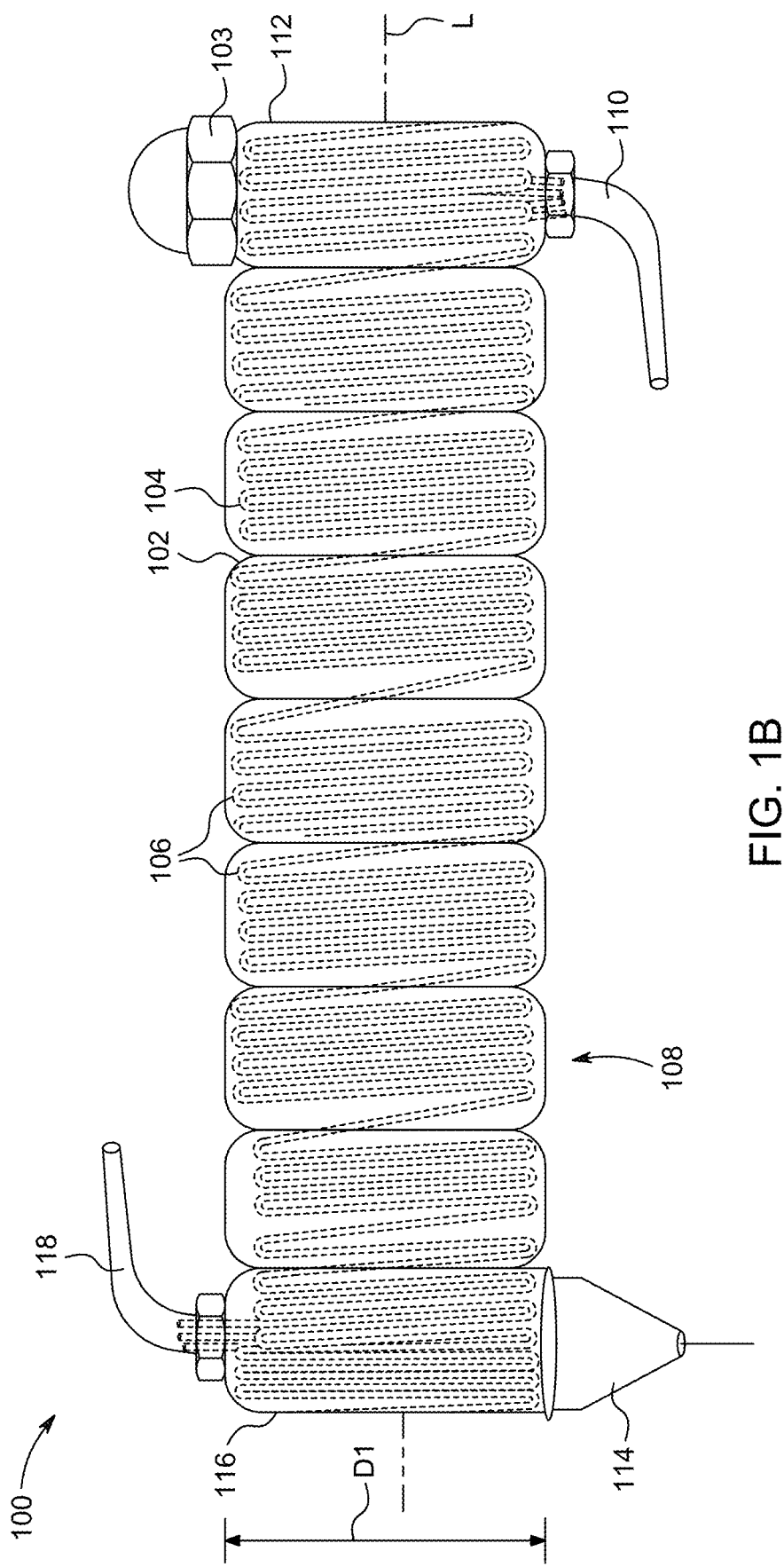
FIG. 1B illustrates the supercoil filtration unit, according to another embodiment of the present disclosure.

FIG. 1B illustrates the unit 100, according to another embodiment of the present disclosure. In this embodiment, the inner coil 104 defines the first interior volume "V1" and the outer coil 102 defines the second interior volume "V2". The features of first interior volume V1 of this configuration may be substantially the same as the features of the second interior volume V2 described above. The features of second interior volume V2 of this configuration may be substantially the same as the features of the first interior volume V1 described above. That is, the features, nature, and/or properties of the two volumes may remain substantially the same as the embodiments described above, but with the identities of the two volumes reversed. The feed inlet 110 is in fluid communication with the first interior volume "V1" of the inner coil 104 proximal to the first end 112 of the outer coil 102 and the retentate outlet 118 is in fluid communication with the first interior volume "V1" of the inner coil 104 proximal to the second end 116 of the outer coil 102. The permeate outlet 114 is in fluid communication with the second interior volume "V2" of the outer coil 102. The embodiment depicted in FIG. 1B may be known as an "end-feed configuration".

The unit 100 is configured to function as the filtration unit, where the fluid to be subjected to filtration flows in an inward to outward direction within the unit 100. In operation, the unfiltered fluid is supplied, through the feed inlet 110, into the first interior volume "V1" of the inner coil 104. As described with respect to FIG. 1A, the inner coil 104 includes hollow fiber membranes 106. A continuous supply of the unfiltered fluid, at a predetermined pressure for a predetermined time period, into the first interior volume "V1" of the inner coil 104 results in filtration of the unfiltered fluid through the hollow fiber membrane 106 and the filtered fluid accumulates in the second interior volume "V2" of the outer coil 102. Such flow of the fluid from the first interior volume "V1" of the inner coil 104 to the second interior volume "V2" of the outer coil 102 constitutes the fluid flow in the inward to outward direction within the unit 100. As such, retentate, such as impurities or portion of the unfiltered fluid, remaining in the inner coil 104 is directed towards the retentate outlet 118 by pressure of inflowing unfiltered fluid.

Figure 2:
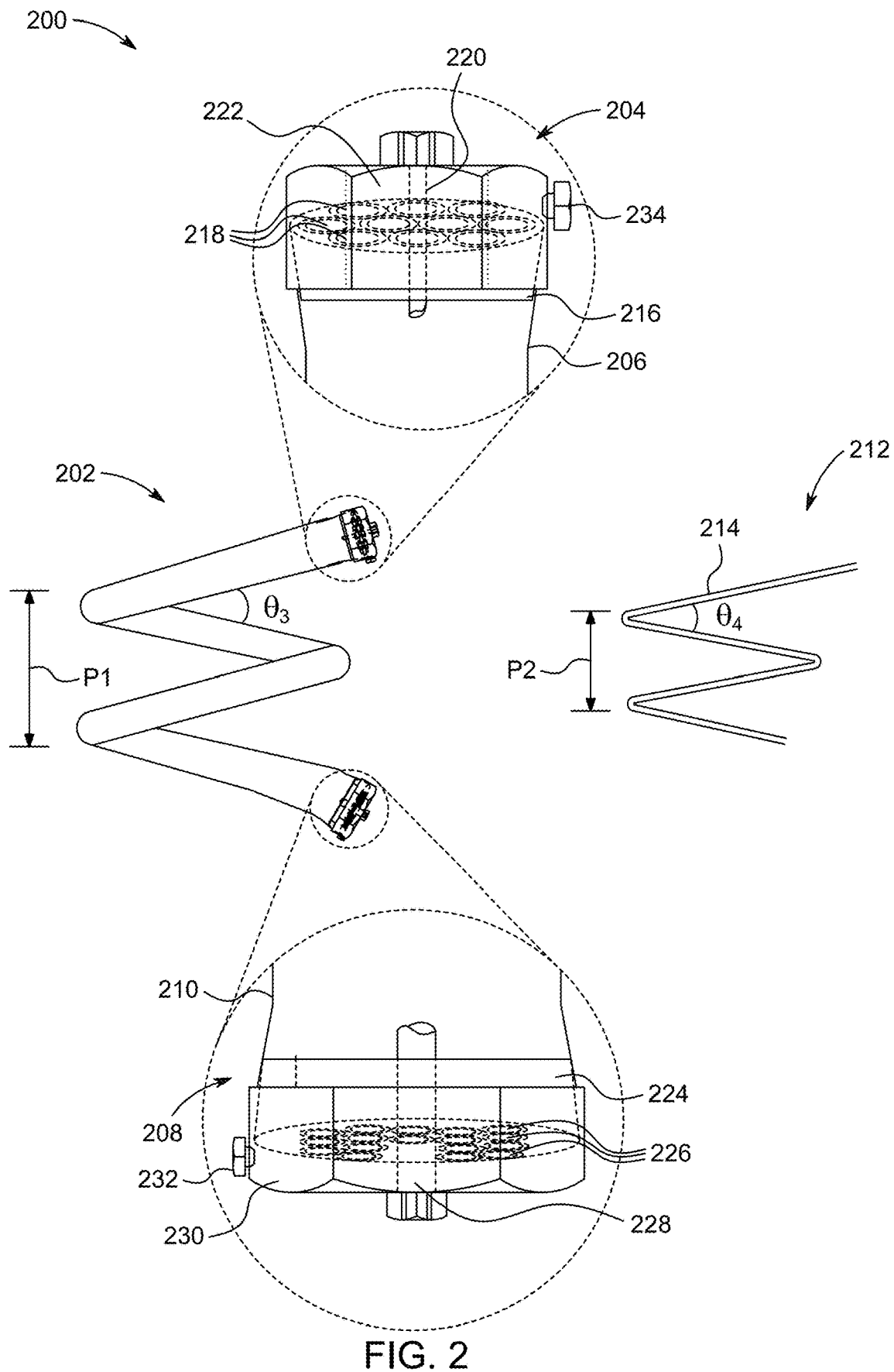
FIG. 2 illustrates another supercoil filtration unit, according to an embodiment of the present disclosure.

FIG. 2 illustrates components of a supercoil filtration unit 200 (alternatively referred to as "the unit 200"), according to another embodiment of the present disclosure. The unit 200 includes an outer coil 202 embodied as a helical structure defining a pitch "P1" and a lead angle θ3. As used herein, the term "pitch" refers to a height of one complete helix turn. In an example, the lead angle θ3 may be in a range of about 30° to about 90°, preferably about 40° to about 80°, preferably about 50° to about 70°. In an embodiment, a first metallic structure 204 is coupled to a first end 206 of the outer coil 202 and a second metallic structure 208 is coupled to a second end 210 of the outer coil 202. In an embodiment, the outer coil 202 may be made of flexible acrylic pipe or a rubber hose capable of withstanding high pressure and high temperature. The unit 200 further includes an inner coil 212 disposed within the outer coil 202. The inner coil 212 multiple hollow fiber membranes which are aligned and arranged into helical bundle (not shown). FIG. 2 also illustrates one hollow fiber membrane 214 of the multiple hollow fiber membranes, embodied as helical coil. The hollow fiber membrane 214 defines a pitch "P2" and a lead angle θ4. In an example, the lead angle θ4 may be in a range of about 30° to about 90°, preferably about 40° to about 80°, preferably about 50° to about 70°. The inner coil 212 is configured to extend between the first end 206 and the second end 210 of the outer coil 202. In the unit 200, the outer coil 202 defines a first internal volume "V3" and the inner coil 212 defines a second internal volume "V4".

FIG. 2 also illustrates enlarged portions of the first end 206 and the second end 210 of the outer coil 202. In the exemplary embodiment depicted in FIG. 2, the first metallic structure 204 is embodied as a hollow structure and includes a first cap 216 configured to couple with the first end 206 of the outer coil 202. In general, the first cap 216 may be coupled with the first end 206 of the outer coil 202 by any suitable structure or method known to one of ordinary skill in the art, for example, press fit, threading, snap-fit, or twist-fit. The first metallic structure 204 may be retained at the first end 206 by any suitable structure or method known to one of ordinary skill in the art, for example by application of glue or by a potting process. In some embodiments, the first cap 216 is embodied as a hollow structure and defines a first set of apertures 218 at an end thereof. In some embodiments, the first metallic structure 204 also includes a feed inlet 220 passing through the first cap 216 and extending into the first interior volume "V3" of the outer coil 202. In some embodiments, the feed inlet 220 is configured to supply unfiltered fluid into the first interior volume "V3" of the outer coil 202. In some embodiments, a first chamber 222 is defined between an internal surface of the first metallic structure 204 and the end of the first cap 216 defining the first set of apertures 218. As such, the first chamber is in fluid communication with the inner coil 212 via the first set of apertures 218.

In some embodiments, each hollow fiber membrane 214 of the multiple hollow fiber membranes may be engaged with a periphery of one aperture 218. As such, ends of multiple hollow fiber membranes may be connected to the first cap 216 and may extend along a length of the outer coil 202. Similarly, the second metallic structure 208 is embodied as a hollow structure and includes a second cap 224 configured to couple with the second end 210 of the outer coil 202 by way of, for example, press fit threading, snap-fit, or twist-fit. In some embodiments, the second metallic structure 208 may be retained at the second end 210 by application of glue or by a potting process. In some embodiments, the second cap 224 is embodied as a hollow structure and defines a second set of apertures 226 at an end thereof. The second metallic structure 208 also includes a feed outlet 228 passing through the second cap 224 and extending into the first interior volume "V3" of the outer coil 202. The feed outlet 228 is configured to drain the unfiltered fluid from the first interior volume "V3" of the outer coil 202. A second chamber 230 is defined between an internal surface of the second metallic structure 208 and the end of the second cap 224 defining the second set of apertures 226. Other ends of the hollow fiber membranes may be engaged with peripheries of apertures of the second set of apertures 226. As such, the second chamber 230 is in fluid communication with the inner coil 212 via the second set of apertures 226.

In operation, the unfiltered fluid is supplied into the first interior volume "V3" of the outer coil 202 via the feed inlet 220. The unfiltered fluid gets filtered across the hollow fiber membranes and enters the second interior volume "V4" of the inner coil 212. By virtue of gravity, filtered fluid collected in the second interior volume "V4" of the inner coil 212 flows into the second chamber 230. A permeate outlet 232 in fluid communication with the second chamber 230 is configured to extract the filtered fluid from the second chamber 230. Unfiltered fluid present in the first interior volume "V3" of the outer coil 202 may be drained through the feed outlet 228. In some embodiments, orientation of the unit 200 may be changed, where the feed outlet 228 may be configured to supply the unfiltered fluid into the first interior volume "V3" of the outer coil 202 and the filtered fluid may be collected in the first chamber 222, which may be subsequently extracted using another permeate outlet 234.

Figures 3A, 3B:
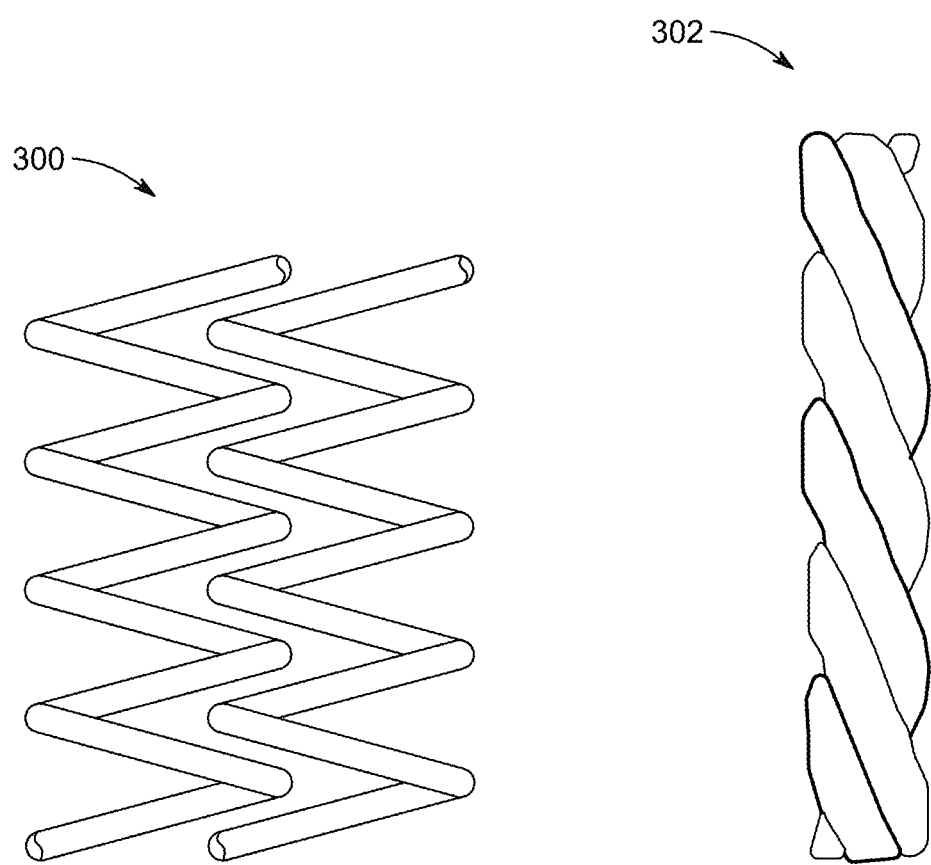
FIG. 3A illustrates a parallel configuration of outer coils of the supercoil filtration unit, according to an embodiment of the present disclosure.
FIG. 3B illustrates a twisted configuration of outer coils of the supercoil filtration unit, according to an embodiment of the present disclosure.

FIG. 3A and FIG. 3B illustrates various configurations of the helical bundle of the hollow fiber membranes applicable to the inner coil 104 of FIG. 1A and FIG. 1B and to the inner coil 212 of FIG. 2. In one embodiment, the hollow fiber membranes 106 may be aligned and arranged in the helical bundle 108 in a substantially parallel configuration 302. For example, each hollow fiber membrane may be positioned parallel to an adjacent hollow fiber membrane. In such an arrangement, multiple hollow fiber membranes constitute the helical bundle 108. In another embodiment, the hollow fiber membrane 106 may be aligned and arranged in the helical bundle 108 in a twisted configuration 304, where one hollow fiber membrane appears to be spirally wound along the other hollow fiber membrane as shown in FIG. 3B. Such configurations of the inner coil 108, 212 provides a large surface area for filtration of unfiltered fluid, thereby increasing separation efficiency and reducing fouling in the unit 100, 200.

Figure 4:
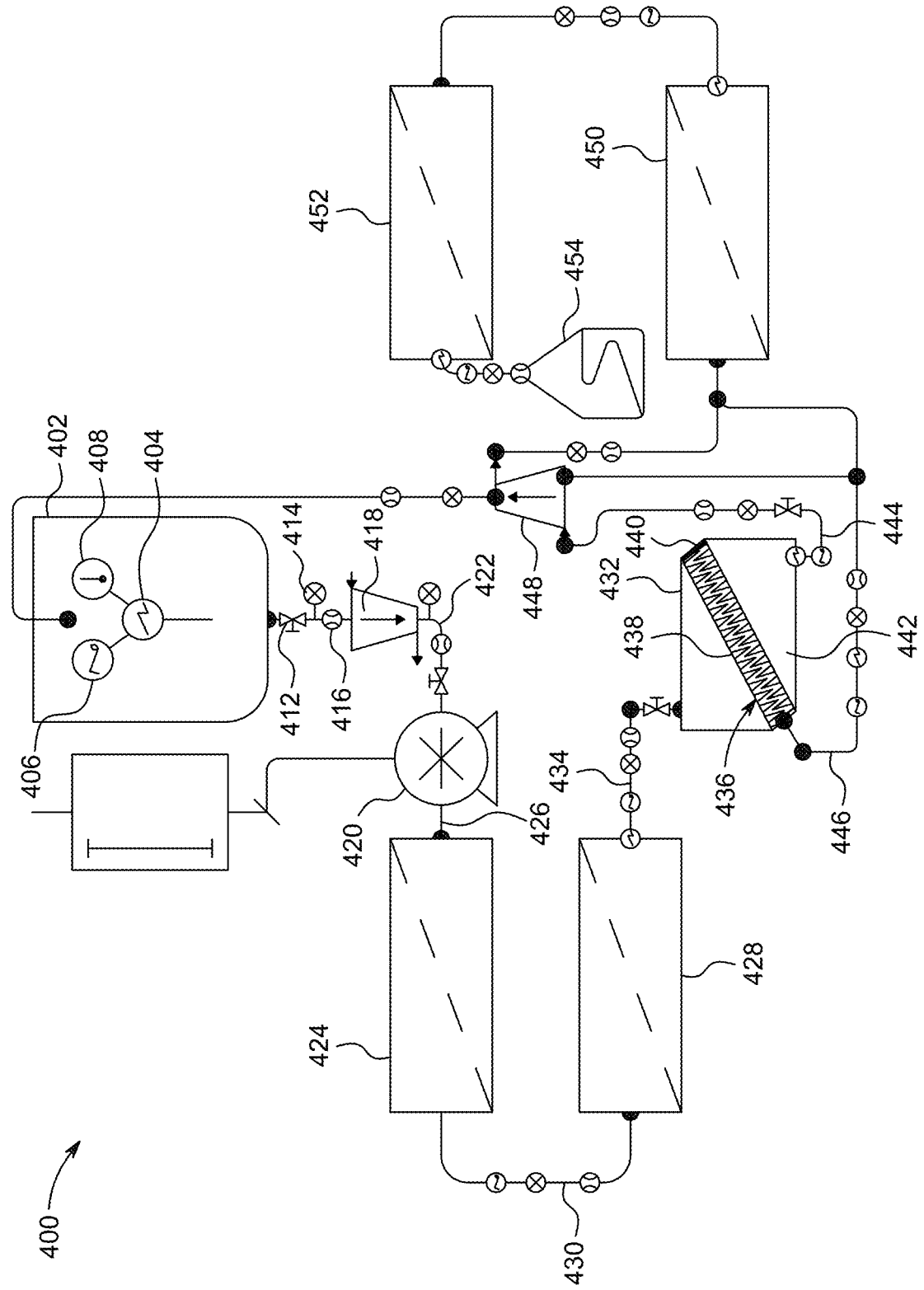
FIG. 4 illustrates a wastewater treatment and mineral water processing system implementing the supercoil filtration unit, according to an embodiment of the present disclosure.

FIG. 4 illustrates a wastewater treatment and mineral water processing system 400 (hereinafter referred to as "the system 400"), according to an embodiment of the present disclosure. The exemplary embodiment shown should be understood to represent the features and components present in some embodiments which may be useful in using the supercoil filtration unit or in performing the method of the present disclosure. Other embodiments not depicted may have additional features and/or components not shown or may not have certain features and/or components depicted. The system 400 includes a feed tank 402 for collecting and storing wastewater effluent or desalinated fluid constituting feed fluid. The feed tank 402 includes a conductivity meter 404 to measure conductivity of the feed fluid, a pH meter 406 to measure pH and/or alkalinity of the feed fluid, and a thermometer 408 to measure temperature of the feed fluid. The system 400 further includes a control valve 412, a feed pressure gauge 414, and a feed flow meter 416 to regulate flow parameters of the feed fluid. The system 400 further includes a mini turbine 418 to convert kinetic energy of the feed fluid flowing therethrough into mechanical energy and further into electrical energy. In an embodiment, the mini turbine 418 is configured to recover up to 40 to 90%, preferably 50 to 80%, preferably 55 to 75%, preferably 60 to 70% of energy associated with the feed fluid. Further, the feed fluid is directed towards a pump 420 via a first duct 422 and subsequently into the sediment removal module 424, depicted as a helical coil silica sand module, via a second duct 426 for sedimentation removal. The feed fluid is further directed to a gas adsorption module 428, depicted as a helical coil of activated carbon, via a third duct 430, for removal of gases from the feed fluid. Pressure drop, mass flow rate, conductivity, and pH are monitored as the feed fluid flow through the third duct 430.

The feed fluid is further directed towards a tangential module 432 via a fourth duct 434. The system 400 implements a supercoil filtration unit 436 to filter the feed fluid therethrough. The supercoil filtration unit 436 functions in a manner similar to that of the unit 100 described with respect to FIG. 1A and FIG. 1B, or the unit 200 described with respect to FIG. 2. The supercoil filtration unit 436 includes hollow fiber membranes 438, where one end of the hollow fiber membranes 438 are blocked by plug-sealed tube sheet 440 using a suitable material known to one of ordinary skill in the art, for example epoxy resin. The feed fluid is subjected to filtration while flowing through the supercoil filtration unit 436. Retentate during the filtration is collected in a retentate chamber 442 and directed into a fifth duct 444 for further permeation. The filtered fluid, via a sixth duct 446, and retentate fluid after further permeation is directed into a two-way mini hydro turbine 448.

Subsequently, the permeate fluid is directed into a helical coil mineral stones module 450 for post-filtration process and further into a second helical coil activated carbon module 452 for removal of excess gases, if any. Filtered permeate is then collected in a storage tank 454 for end use applications. Any further retentate from the two-way mini hydro turbine 448 is directed into the feed tank 402 for further filtration.

Figure 5:
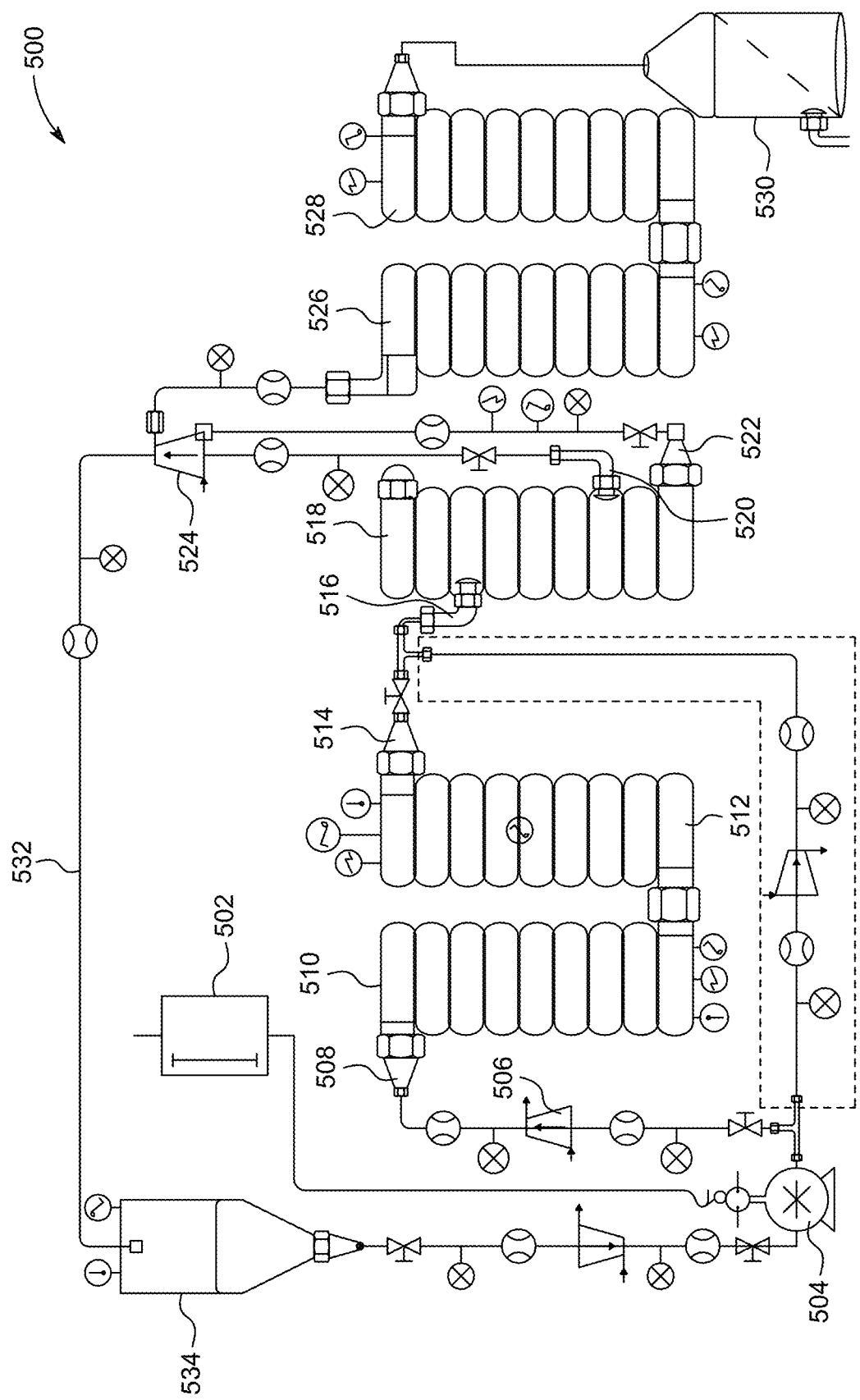
FIG. 5 illustrates another wastewater treatment and mineral water processing system implementing the supercoil filtration unit, according to an embodiment of the present disclosure.

FIG. 5 illustrates a wastewater treatment and mineral water processing system 500, according to another embodiment of the present disclosure. The system 500 functions in a manner similar to the system 400 described with respect to FIG. 4. However, the system 500 implements the unit 100 described with respect to FIG. 1A and FIG. 1B. The system 500 includes a feed tank 502 configured to store feed fluid to be subjected to filtration process. A pump 504 is provided downstream of the feed tank 502 to pressurize the feed fluid prior to supplying the feed fluid through a first mini turbine 506, where a kinetic energy of the feed fluid is converted into mechanical energy. In some embodiments, the first mini turbine 506 may be configured to recover about 40 to 90%, preferably 50 to 80%, preferably 55 to 75%, preferably 60 to 70% of energy associated with the feed fluid. The feed fluid is further directed through a feed inlet 508 of helical coil silica sand module 510 to remove sediments from the feed fluid and then into a helical coil activated carbon module 512 to remove gases from the feed fluid. Further, the feed fluid free from gases passes through a permeate outlet 514 of the helical coil activated carbon module 512 to enter a main feed inlet 516 of a supercoil filtration unit 518. In an embodiment, the supercoil filtration unit 518 includes an outer coil and an inner coil disposed within the outer coil, where the inner coil includes multiple hollow fiber membranes, such as the hollow fiber membranes 106 illustrated in FIG. 1A, configured to filter the feed fluid.

Further, filtered fluid exits the supercoil filtration unit 518 through a main permeate outlet 522 and retentate is drained through a retentate outlet 520. In an embodiment, the retentate exiting the retentate outlet 520 may be subjected to subsequent filtration process prior to directing into a second mini turbine 524. Additionally, the filtered fluid from the main permeate outlet 522 is supplied to the second mini turbine 524. A first outlet of the second mini turbine 524 is connected to a helical coil mineral stones module 526, where the filtered fluid is subjected to post filtration process following which the filtered fluid is supplied into a helical coil activated carbon module 528 for removal of any excess gases. Such integrated post-treatment helical coils aid removal of sludge and other particulate matter from the filtered fluid. Permeate from the helical coil activated carbon module 528 constitutes final filtered fluid which may be supplied for end-use applications. Further, at the second mini turbine 524, a second outlet is in fluid communication with a duct 532 configured to recirculate the retentate from the second mini turbine 524 towards the pump 504 via a retentate collection chamber 534.

Figure 6:
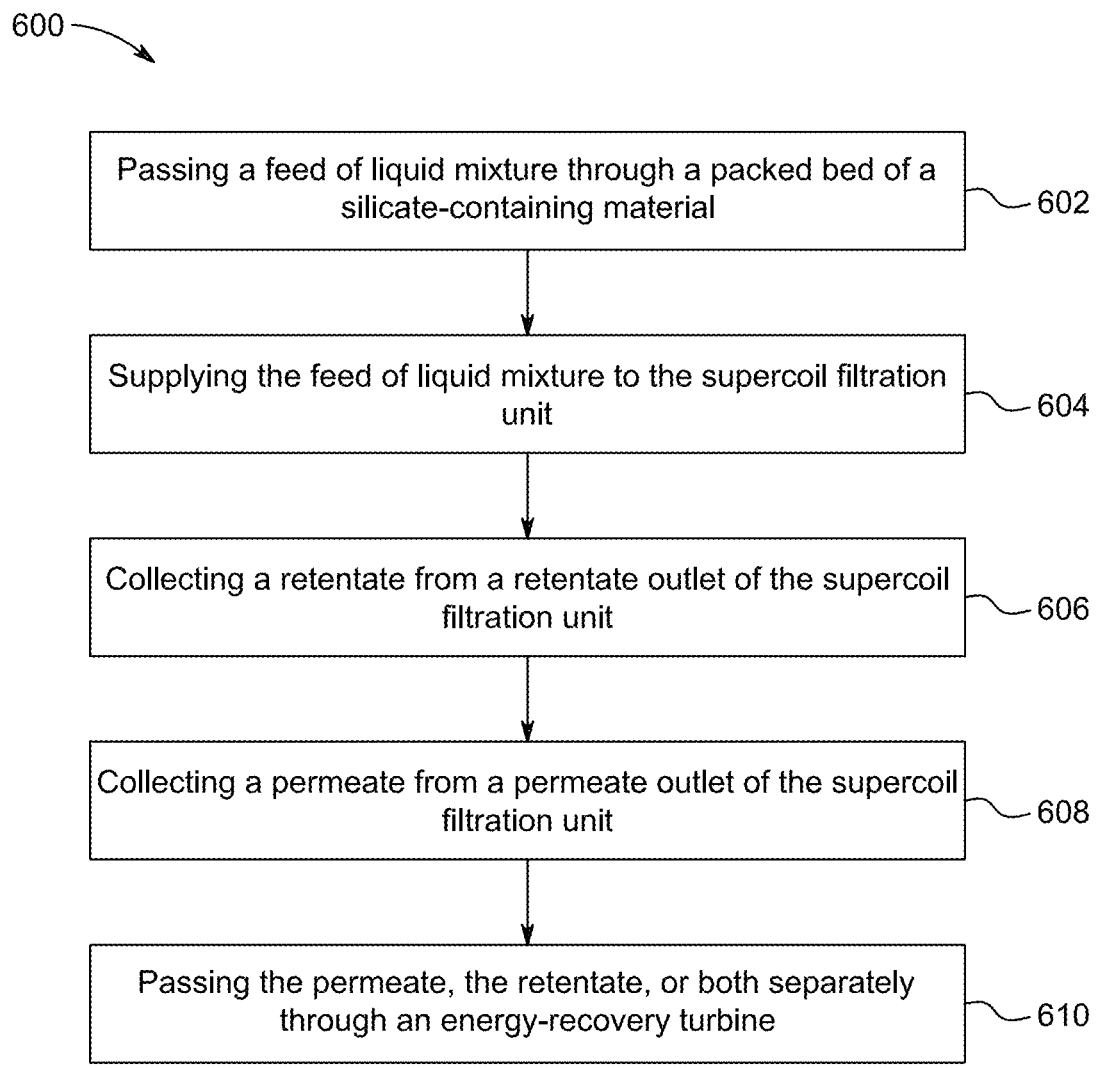
FIG. 6 illustrates a flowchart of a method of separating components in a liquid mixture, according to an embodiment of the present disclosure.

FIG. 6 illustrates a flowchart of a method 600 of separating components in a liquid mixture, according to an embodiment of the present disclosure. The method 600 is described in conjunction with FIG. 1A through FIG. 5. At step 602, the method 600 includes passing the feed, of a liquid mixture, such as the feed fluid to be subjected for filtration, through a packed bed of a silicate-containing material, such as the helical coil silica sand module 424, 510.

At step 604, the method 600 includes supplying the feed of the liquid mixture to the supercoil filtration unit, such as the unit 100, 200. At step 606, the method 600 includes collecting the retentate from the retentate outlet 118, 228. At step 608, the method 600 includes collecting the permeate from the permeate outlet 114, 232. At step 610, the method 600 includes passing the permeate, the retentate, or both separately through the energy-recovery turbine 418, 506.

To this end, the supercoil filtration unit of the present disclosure achieves efficient filtration of the unfiltered fluid. When used for the filtration of polluted liquid, the hollow fiber membranes rarely cohere together into a mass, and surface of the hollow fiber membranes can be efficiently cleaned concurrently with the filtration, thereby minimizing loss of filtering function. The length of the hollow fiber membranes may be determined by one of ordinary skill in the art. This determination may be based on factors such as the identity of the fluid, the identity of components to be removed by the filtration unit, and/or the amount of said components to be removed. The filtration unit, thus, may have a combined capacity per unit volume which is greater than conventional filtration units. Further, since lengthy hollow fiber membranes are accommodated within shorter outer coil, the present disclosure provides compact construction of the supercoil filtration unit associated with effective filtration of fluids.

Obviously, numerous modifications and variations of the present invention are possible in light of the above teachings. It is therefore to be understood that, within the scope of the appended claims, the invention may be practiced otherwise than as specifically described herein.

The invention claimed is:

1. A supercoil filtration unit comprising:
    an outer coil having a helical shape defined by an outer coil longitudinal axis and outer coil turns wound around the outer coil longitudinal axis;
    an inner coil comprising a plurality of hollow fiber membranes which are aligned and arranged into a helical bundle, the inner coil being disposed within the outer coil and being oriented such that an inner coil longitudinal axis around which turns of the inner coil are wound is substantially parallel with the turns of the outer coil;
    a feed inlet disposed upon the outer coil near a first end and in fluid communication with a first interior volume;
    a permeate outlet disposed upon the outer coil near a second end at a location distant from the feed inlet and in fluid communication with a second interior volume which is not in fluid communication with the first interior volume; and
    a retentate outlet disposed upon the outer coil near the second end at a location distant from the feed inlet and in fluid communication with the first interior volume.

2. The supercoil filtration unit of claim 1, wherein the first interior volume is defined by the outer coil and the second interior volume is defined by the inner coil.

3. The supercoil filtration unit of claim 1, wherein the first interior volume is defined by the inner coil and the second interior volume is defined by the outer coil.

4. The supercoil filtration unit of claim 1, wherein the outer coil has a lead angle of 15 to 60°.

5. The supercoil filtration unit of claim 1, wherein the outer coil has 5 to 10 turns per meter.

6. The supercoil filtration unit of claim 1, wherein the inner coil has a lead angle of 15 to 60°.

7. The supercoil filtration unit of claim 1, wherein the inner coil has 40 to 80 turns per meter.

8. The supercoil filtration unit of claim 1, wherein the plurality of hollow fiber membranes are aligned and arranged in the helical bundle in a substantially parallel configuration.

9. The supercoil filtration unit of claim 1, wherein the plurality of hollow fiber membranes are aligned and arranged in the helical bundle in a twisted configuration.

10. The supercoil filtration unit of claim 1, wherein the outer coil comprises a metallic support.

11. The supercoil filtration unit of claim 1, wherein the outer coil has an outer diameter of 0.15 to 0.35 m.

12. The supercoil filtration unit of claim 1, wherein the hollow fiber membranes are constructed of a polymer.

13. The supercoil filtration unit of claim 12, wherein the polymer is at least one selected from the group consisting of cellulose acetate, polysulfone, polyethersulfone, and polyvinylidene fluoride.

14. The supercoil filtration unit of claim 1, wherein the hollow fiber membranes have a mean pore size selected from the group consisting of greater than 0.01 to 0.1 μm, greater than 0.001 to 0.01 μm, and greater than 0.0001 to 0.001 μm.

15. A wastewater treatment and mineral water processing system, comprising:
    a feed tank;
    a sediment removal module connected to the feed tank;
    a gas adsorption module connected to the sediment removal module;
    a tangential module comprising the supercoil filtration unit of claim 1 wherein the feed inlet is connected to the gas adsorption module;
    wherein the tangential module separates a feed comprising a contaminated water into a permeate and a retentate.

16. The wastewater treatment and mineral water processing system of claim 15, wherein the sediment removal module comprises a packed bed of a silicate-containing material and the gas adsorption module comprises activated carbon.

17. The wastewater treatment and mineral water processing system of claim 15, further comprising one or more energy recovery turbines, each turbine being connected to the permeate outlet or the retentate outlet.

18. A method of separating components in a liquid mixture, the method comprising:
    supplying to the supercoil filtration unit of claim 1 a feed of the liquid mixture;
    collecting from the retentate outlet a retentate; and
    collecting from the permeate outlet a permeate.

19. The method of claim 18, further comprising passing the liquid mixture through a packed bed of a silicate-containing material before supplying to the supercoil filtration unit.

20. The method of claim 18, further comprising passing the permeate, the retentate, or both separately through an energy-recovery turbine.

* * * * *